(12) United States Patent  
Sakuragi

(10) Patent No.: US 9,811,809 B2  
(45) Date of Patent: Nov. 7, 2017

(54) BELT MANAGEMENT SYSTEM AND METHOD

(71) Applicant: BRIDGESTONE CORPORATION, Chuo-ku, Tokyo (JP)

(72) Inventor: Akira Sakuragi, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 293 days.

(21) Appl. No.: 14/404,253

(22) PCT Filed: May 16, 2013

(86) PCT No.: PCT/JP2013/063672  
§ 371 (c)(1),  
(2) Date: Nov. 26, 2014

(87) PCT Pub. No.: WO2013/179903  
PCT Pub. Date: Dec. 5, 2013

(65) Prior Publication Data  
US 2015/0170109 A1 Jun. 18, 2015

(30) Foreign Application Priority Data

May 30, 2012 (JP) .................................. 2012-123554

(51) Int. Cl.  
*G06Q 10/00* (2012.01)  
*B65G 43/02* (2006.01)  
(Continued)

(52) U.S. Cl.  
CPC .............. *G06Q 10/20* (2013.01); *B65G 43/02* (2013.01); *G01B 7/107* (2013.01); *G01B 21/08* (2013.01); *G06Q 10/06315* (2013.01)

(58) Field of Classification Search  
None  
See application file for complete search history.

(56) References Cited

U.S. PATENT DOCUMENTS 9,216,861 B2 * 12/2015 Adachi ............. H01M 10/0409  
2008/0047348 A1 * 2/2008 Brown ................. G01N 29/043  
73/599

(Continued)

FOREIGN PATENT DOCUMENTS

JP 9-12128 A 1/1997  
JP 11-334852 A 12/1999  
(Continued)

OTHER PUBLICATIONS

International Search Report of PCT/JP2013/063672, dated Aug. 13, 2013. [PCT/ISA/210].

*Primary Examiner* — Thomas L Mansfield, Jr.  
(74) *Attorney, Agent, or Firm* — Sughrue Mion, PLLC

(57) ABSTRACT

A belt management system of the present invention is formed by a management server (1) that manages belts that are used in a belt conveyor, a terminal (2) that is provided in a location where the belt conveyor is installed, and a data server (3) that is provided in a company that manufactures and sells belts, wherein the management server is provided with: a transceiver unit (10) that receives in time series belt remaining thickness data that shows the thickness of the belt and that is supplied from the terminal at each one of predetermined periods; and a belt lifespan prediction unit (11) that, by writing the belt remaining thickness data in the management database in time series, and reading from the management database the belt remaining thickness data that has been stored in time series, and dividing the difference between the predetermined periods by the usage amount of the belt at each of the predetermined periods, and determining a unit amount of change in the usage amount units, and subtracting from the most recent belt remaining thickness data a management threshold value which shows the thickness of the belt and which is to be used as an indicator for replacement, and dividing the result of this subtraction by (Continued)

the unit amount of change, determines a remaining lifespan that shows the future amount of use until the belt needs to be replaced.

12 Claims, 12 Drawing Sheets

(51) Int. Cl.
*G01B 21/08* (2006.01)
*G06Q 10/06* (2012.01)
*G01B 7/06* (2006.01)

(56) References Cited

U.S. PATENT DOCUMENTS

| | | | | |
|---|---|---|---|---|
| 2008/0133051 | A1* | 6/2008 | Wallace | B65G 43/00 700/230 |
| 2009/0043441 | A1* | 2/2009 | Breed | G06K 7/10178 701/31.9 |
| 2009/0303065 | A1* | 12/2009 | Lipowski | B65G 43/02 340/679 |
| 2011/0046775 | A1* | 2/2011 | Bailey | B07C 3/00 700/224 |
| 2011/0049210 | A1* | 3/2011 | Kameda | A61F 13/15764 226/46 |
| 2012/0217132 | A1* | 8/2012 | Twigger | B65G 43/06 198/502.1 |
| 2012/0286948 | A1* | 11/2012 | Ganapathy | B65G 43/02 340/539.1 |
| 2014/0326582 | A1* | 11/2014 | Sakaguchi | B65G 43/02 198/810.02 |

FOREIGN PATENT DOCUMENTS

| | | |
|---|---|---|
| JP | 2003-308403 A | 10/2003 |
| JP | 2005-112499 A | 4/2005 |
| JP | 2009-12957 A | 1/2009 |
| JP | 4438212 B2 | 3/2010 |
| JP | 2010-260645 A | 11/2010 |
| JP | 2012-18623 A | 1/2012 |

* cited by examiner

*FIG. 4A*

| LINE NAME | BELT THICKNESS | BELT MAKER | BELT PART NUMBER | TRANSPORTED MATERIAL | BELT THICKNESS INITIAL VALUE | MANAGEMENT LIMIT VALUE |
|---|---|---|---|---|---|---|
| LINE L1 | LP1 | COMPANY A | DG1 | IRON ORE | DF1 | S1 |
| LINE L2 | LP2 | COMPANY B | DG2 | COKE | FF2 | S2 |
| LINE L3 | LP3 | COMPANY C | DG3 | COAL | DF3 | S3 |

*FIG. 4B*

| LINE NAME | INSTALLATION DATE | DATE OF LAST MEASUREMENT | ELAPSED NUMBER OF DAYS | TOTAL TRANSPORT AMOUNT | THICKNESS DATA | WEAR RATE | REMAINING LIFESPAN | PLANNED REPLACEMENT DATE |
|---|---|---|---|---|---|---|---|---|
| LINE L1 | X/D/R | X/P/J | C | W1 | DM1 | ADM1 | P1 | X/F/R |
| LINE L2 | X/J/U | X/D/M | F | W3 | DM2 | ADM2 | P2 | X/G/H |
| LINE L3 | X/Q/Z | X/M/U | H | W3 | DM3 | ADM3 | P3 | X/S/M |

FIG. 6A

| LINE NAME | COMPANY NAME | INSTALLATION DATE | MATERIAL COST | ENDLESS OPERATING COSTS | MAINTENANCE COSTS | ELECTRICITY COST | TOTAL COST (/YEAR) | TOTAL COST (/TON) |
|---|---|---|---|---|---|---|---|---|
| LINE L1 | COMPANY A | X/D/R | X1 | Y1 | R1 | E1 | T1 | T1 |
| LINE L2 | COMPANY B | X/J/U | X2 | Y2 | R2 | E2 | T2 | T2 |
| LINE L3 | COMPANY C | X/Q/Z | X3 | Y3 | R3 | E3 | T3 | T3 |

FIG. 6B

| LINE NAME | INSTALLATION PERIOD | COMPANY NAME | MATERIAL COST | ENDLESS OPERATING COSTS | MAINTENANCE COSTS | ELECTRICITY COST | TOTAL COST (/YEAR) | TOTAL COST (/TON) |
|---|---|---|---|---|---|---|---|---|
| LINE L1 | X~ | COMPANY A | X1 | Y1 | R1 | E1 | T1 | T1 |
| | S~X | COMPANY B | X21 | Y21 | R21 | E21 | T21 | T21 |
| | M~S | COMPANY C | X31 | Y31 | R31 | E31 | T31 | T31 |

FIG. 7

| MANUFACTURER | PART NUMBER | BELT IDENTIFICATION INFORMATION | REMAINING QUANTITY | PART NUMBER TOTAL REMAINING QUANTITY | MANAGEMENT REMAINING QUANTITY |
|---|---|---|---|---|---|
| COMPANY A | B1 | BA1234 | 200 | 2200 | 1000 |
| | | BA4568 | FUL | | |
| | | BA3349 | FUL | | |
| | B5 | BB8965 | 800 | 800 | 500 |
| COMPANY B | N1 | NA2356 | 100 | 1100 | 1200 |
| | | NA2225 | FUL | | |
| | N9 | NB3246 | 600 | 1600 | 1500 |
| | | NB9987 | FUL | | |

FIG. 8A

| LINE NUMBER | DETECTION THRESHOLD VALUE |
|---|---|
| LINE L1 | XXXXX |
| LINE L2 | YYYYY |
| LINE L3 | ZZZZZ |

FIG. 8B

| DETECTION DATE | LINE NUMBER | DETECTION POSITION | INDEX |
|---|---|---|---|
| W/D/U1 | LINE L1 | M5-4 | IND45 |
| W/D/U2 | LINE L2 | M3-2 | IND46 |
| W/D/U3 | LINE L1 | M4-9 | IND47 |

BELT MANAGEMENT SYSTEM AND METHOD

CROSS REFERENCE TO RELATED APPLICATIONS

This application is a National Stage of International Application No. PCT/JP2013/063672 filed May 16, 2013, claiming priority based on Japanese Patent Application No. 2012-123554, filed May 30, 2012, the contents of all of which are incorporated herein by reference in their entirety.

TECHNICAL FIELD

The present invention relates to a belt management system that manages the belt of a belt conveyor, and to a method for the same.

Priority is claimed on Japanese Patent Application No. 2012-123554, filed May 30, 2012, the contents of which are incorporated herein by reference.

BACKGROUND ART

Conventionally, belt conveyors are used for the transporting of minerals such as coal and ore that have been mined on-site at a mine, or for the transporting of industrial products in a factory.

As is shown in Patent document 1 (see below), for example, operations are carried out to detect any deterioration or damage to the belt of the belt conveyor that is transporting the minerals such as coal and iron ore.

Lacerations (i.e., vertical tears) in the longitudinal direction are generated in the belt by the deterioration of the belt or by the detection operation, and it can be inferred in advance that the belt will become damaged and obstructions to the transporting of ore will be generated, and processing such as repairs and the like can consequently be performed.

DOCUMENTS OF THE PRIOR ART

Patent Documents

[Patent document 1] Japanese Unexamined Patent Application (JP-A) No. 2009-12957

SUMMARY OF INVENTION

Technical Problem

However, in Patent document 1, although it is possible to infer in advance that damage to the belt will occur, it is not possible to know definitively exactly when the belt should be replaced.

Namely, the extent of the current damage to the belt can be ascertained, and an operator determines whether or not the belt should be replaced by the extent of the deterioration.

Because of this, the belt is replaced at a point that is determined by the operator, and because it is unclear as to when a belt will need to be replaced, it is necessary for a replacement belt to be kept constantly in inventory.

Because of this, the fact that a replacement belt needs to be kept constantly in inventory means that belts are being held in inventory unnecessarily, and this leads to an increase in the running costs of the belt conveyor.

Moreover, if the transported material that is being transported by the belt conveyor changes, the type of belt conveyor used on that line also changes, and there are many instances of belts being held in inventory for no purpose.

The present invention was conceived in view of the above-described circumstances, and it is an object thereof to provide a belt management system that makes clear when a belt needs to be replaced, and reduces the running costs of a belt conveyor by managing the belts being held in inventory, and to also provide a method for the same.

Solution to Problem

A belt management system according to a first aspect of the present invention is a belt management system that is formed by a management server that manages belts that are used in a belt conveyor, a terminal that is provided in a location where the belt conveyor is installed, and a data server that is provided in a company that manufactures and sells belts, wherein the management server is provided with: a transceiver unit that receives in time series from the terminal belt remaining thickness data that shows the thickness of the belt and that is supplied from the terminal at each one of predetermined periods; and a belt lifespan prediction unit that, by writing the belt remaining thickness data in the management database in time series, and reading from the management database the belt remaining thickness data that has been stored in time series, and dividing the differences between the predetermined periods by the usage amount of the belt at each of the predetermined periods, and determining a unit amount of change in the usage amount units, and subtracting from the most recent belt remaining thickness data a management threshold value which shows the thickness of the belt and which is to be used as an indicator for replacement, and dividing the result of this subtraction by the unit amount of change, determines a remaining lifespan that shows the future amount of use until the belt needs to be replaced.

In the belt management system according to a second aspect of the present invention, when the remaining lifespan drops below a usage amount in the predetermined period that has been set in advance, the belt lifespan prediction unit according to the first aspect transmits an alarm recommending that the belt be replaced to the terminal and the data server.

In the belt management system according to a third aspect of the present invention, a measuring unit that measures the belt remaining thickness data is provided in the belt conveyor according to the first or second aspects, and the terminal transmits to the management server the belt remaining thickness data that has been measured after each of the predetermined periods by the measuring unit.

In the belt management system according to a fourth aspect of the present invention, the usage amount according to the first through third aspects is the weight of transport material that has been transported by the belt conveyor, and the remaining lifespan shows the weight that can be subsequently transported from the point in time when the most recent belt remaining thickness data was measured.

In the belt management system according to a fifth aspect of the present invention, the usage amount according to the first through third aspects is the period for which the belt conveyor transported the transport material, and the remaining lifespan shows the period for which transport material can be subsequently transported from the point in time when the most recent belt remaining thickness data was measured.

In the belt management system according to a sixth aspect of the present invention, the management server according to the first through fifth aspects is further provided with: an expenditure database in which are written and stored in belt conveyor units for each different type of belt a total cost of ownership including at least the belt price, maintenance costs, and the electricity cost; and a total cost of ownership calculating unit that determines a total cost in usage amount units by dividing a sum total of the belt price, the maintenance costs, and the electricity cost that has been stored in the expenditure database by the usage amount, and then associating this total cost in usage amount units with the corresponding belt of the belt conveyor and writing and storing the result in the expenditure database.

In the belt management system according to a seventh aspect of the present invention, the management server according to the first through sixth aspects is further provided with: an inventory database in which an inventory quantity for each different type of belt at the location where the belt conveyor is installed, and a management remaining quantity which shows the minimum inventory quantity of each different type of belt that is required in order to manage the belt conveyor are written and stored in advance; and a belt inventory management unit that, when the inventory quantity drops below the management remaining quantity, recommends to the terminal and the data server that it is necessary to buy new inventory.

In the belt management system according to an eighth aspect of the present invention, the management server according to the first through seventh aspects is further provided with: a fault database that shows detection threshold values that are set for each line and are used to determined whether or not a fault has occurred; and a fault management unit that compares detection values showing the state of a belt that are supplied from the terminal with the detection threshold values, and when the result of this comparison indicates a fault in the belt, transmits a notification to the terminal and to the data server that shows that a fault has occurred in the belt.

A belt management method according to a ninth aspect of the present invention is a belt management method that causes a belt management system that is formed by a management server that manages belts that are used in a belt conveyor, a terminal that is provided in a location where the belt conveyor is installed, and a data server that is provided in a company that manufactures and sells belts to operate, wherein the belt management method includes: a transmitting and receiving step in which belt remaining thickness data that shows the thickness of the belt and that is supplied from the terminal at each one of predetermined periods is received in time series; and a belt lifespan prediction step in which, by writing the belt remaining thickness data in the management database in time series, and reading from the management database the belt remaining thickness data that has been stored in time series, and dividing the differences between the predetermined periods by the usage amount of the belt at each one of the predetermined periods, and determining a unit amount of change in the usage amount units, and subtracting from the most recent belt remaining thickness data a management threshold value which shows the thickness of the belt and which is to be used as an indicator for replacement, and dividing the result of this subtraction by the unit amount of change, a remaining lifespan that shows the future amount of use until the belt needs to be replaced is determined.

Effects of the Invention

According to this invention, because the usable lifespan is predicted from the amount of wear of a belt, the replacement time for the belt is made clear, and by managing the inventory of belts to suit this replacement time, it is possible to avoid holding unnecessary inventory, and to thereby reduce the running costs of a belt conveyor.

Note that in the present invention, the term 'plurality' refers to an optional number of at least two or more.

BRIEF DESCRIPTION OF THE DRAWINGS

FIG. 4A is a view showing the structures of a management table for each line of a belt conveyor that is installed in a particular factory, and of a usage history table that shows the usage history of the belt of each line with both these tables being stored in a management database according to an embodiment of the present invention.

FIG. 4B is a view showing the structures of a management table for each line of a belt conveyor that is installed in a particular factory, and of a usage history table that shows the usage history of the belt of each line with both these tables being stored in a management database according to an embodiment of the present invention.

FIG. 6A is a view showing an example of the structure of expenditure tables (i.e., an operational table and the usage history table that are described below) that are written in advance in an expenditure database according to an embodiment of the present invention and stored therein.

FIG. 6B is a view showing an example of the structure of expenditure tables (i.e., an operational table and the usage history table that are described below) that are written in advance in an expenditure database according to an embodiment of the present invention and stored therein.

FIG. 7 is a view showing an example of the structure of an inventory table that is written in advance in an inventory database according to an embodiment of the present invention and stored therein.

FIG. 8A is a view showing an example of the structure of a table that is written in advance in a fault database according to an embodiment of the present invention and stored therein.

FIG. 8B is a view showing an example of the structure of a table that is written in advance in a fault database according to an embodiment of the present invention and stored therein.

DESCRIPTION OF EMBODIMENTS

First Embodiment

Figure 1:
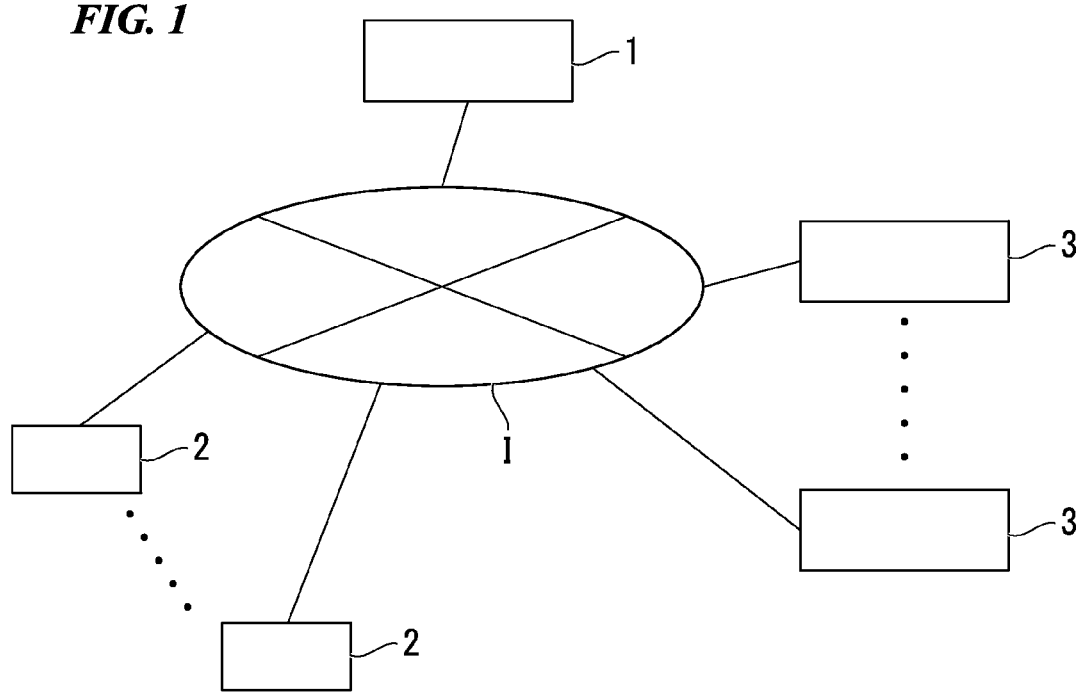
FIG. 1 is a view showing an example of the structure of a belt management system according to an embodiment of the present invention.

Hereinafter, an embodiment of the present invention will be described in detail with reference made to the drawings. FIG. 1 is a view showing an example of the structure of a belt management system according to a first embodiment of this invention.

In FIG. 1, a management server 1 is connected to an information communication network I that includes the Internet, and performs processing such as determining replacement times and managing the inventory and the like of belts (i.e., conveyor belts) of belt conveyors that are used in factories or in mineral mines and the like.

Terminals 2 are installed in locations corresponding to each line such as in administrative buildings of the aforementioned factories and mineral mines, and these terminals 2 transmit and receive data between themselves and the management server 1 and data servers 3 (described below) via the information communication network I.

The data servers 3 are provided in companies that manufacture and sell belts (i.e., manufacturing and sales corporations) for the belt conveyors that are used in factories and mineral mines and the like, and these data servers 3 transmit and receive data between themselves and the management server 1 and the terminals 2 via the information communication network I.

Moreover, in the present embodiment, for example, the belt management system enables the terminals 2, the data servers 3, and the management server 1 to work in cooperation with each other, and the management server 1 efficiently provides a cloud service for the terminals 2 and the data servers 3. This cloud service is constructed as a PaaS (Platform as a Service) that provides a basic infrastructure for executing applications that manage the belt inventory including the remaining lifespan of the belts (described below). Here, the management server 1 may be formed by a single server, or may be formed by a plurality of servers that perform the functions of managing the belts in cooperation with each other.

When an operator executes an application for the above-described belt management system from a terminal 2, the operator connects to an online service of the management server 1 from that terminal 2. Under the control of the application started up by this online service, the terminal 2 then displays on a display screen, for example, an input column for an ID (identification) code and a password (i.e., identification information identifying the terminal 2), and an image requesting that the operator input an ID code and password into this input column. Namely, the identification information identifying the terminals 2 is actually information identifying the factory or mine where each line is located.

Once the operator has input the ID code and password into the input column, the terminal 2 transmits the input ID code and password to the management server 1 via the information communication network I.

The management server 1 authenticates the ID code and password supplied from the terminal 2, and using the data from each table (i.e., tables that are written in advance in each of a management database 15, an expenditure database 16, an inventory database 17, and a fault database 18 and stored therein) that corresponds to this ID code and password, performs management for the belt of the belt conveyor of the line in the factory or mine or the like that corresponds to the ID code and password.

Figure 2:
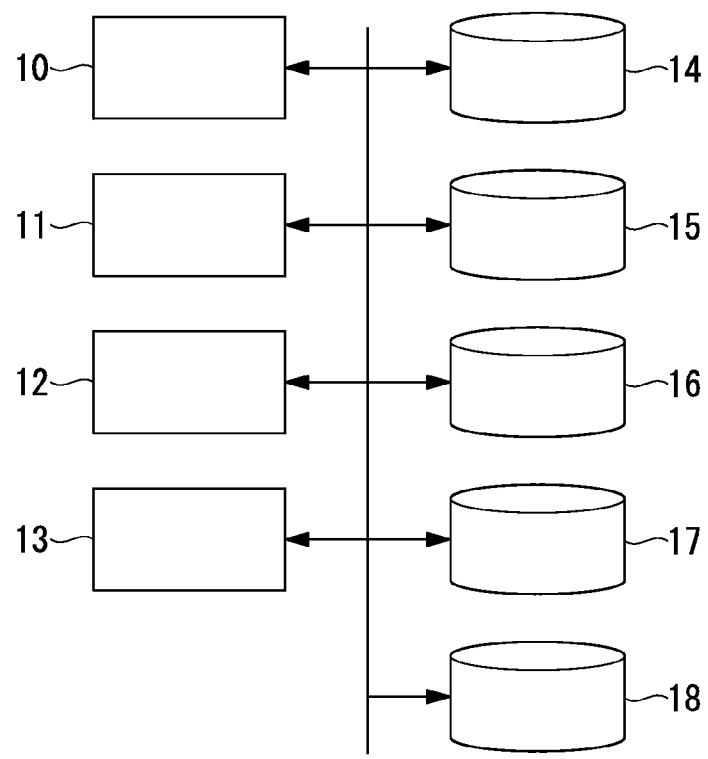
FIG. 2 is a block diagram showing an example of the structure of a management server in the belt management system shown in FIG. 1.

Next, FIG. 2 is a block diagram showing an example of the structure of the management server 1 in the belt management system shown in FIG. 1.

In this drawing, the management server 1 is provided with a transceiver unit 10, a belt lifespan prediction unit 11, a total cost of ownership calculating unit 12, a belt inventory management unit 13, a fault management unit 14, the management database 15, the expenditure database 16, the inventory database 17, and the fault database 18.

The transceiver unit 10 transmits and receives various items of data (described below) and notification signals (i.e., alarms) between itself and both the terminals 2 and the data servers 3 via the information communication network I.

Hereinafter, operations of each of the above-described belt lifespan prediction unit 11, total cost of ownership calculating unit 12, belt inventory management unit 13, and fault management unit 14 will be described.

[Belt Lifespan Prediction Unit 11]

The belt lifespan prediction unit 11 calculates a belt wear rate (i.e., a unit amount of change using time for the units) from belt remaining thickness data that shows the thickness of the belt and is sent in a time series at a fixed cycle (i.e., at fixed periods) from the terminals 2. Note that the belt remaining thickness data does not necessarily need to be sent at fixed periods, and may simply be sent after predetermined periods, for example, the intervals between when the terminals 2 send the remaining thickness data may be irregular such as every week, or every three days or the like. This belt remaining thickness data is data to which identification information for each of the respective terminals 2 is attached, and that is supplied from the terminals 2 as a belt replacement index. The belt remaining thickness data may be either data that has been measured by an operator and input into a terminal 2, or data that, as is described below, is measured by a measuring device and is collected from the measurement device by the terminals 2 at measurement periods which are set in advance (at a fixed cycle, these periods are used for the usage amount units) and is then transmitted. In the present embodiment, the usage amount is the period for which the belt was used or, as is described below, the amount of transportation of transported articles.

The belt lifespan prediction unit 11 subtracts the current belt thickness data from a previously set management limit value, and calculates the remaining usable period by dividing the difference resulting from this subtraction by the wear rate. This is then output as the remaining lifespan. Here, the management limit value is set as a numerical value showing that the possibility of damage increases as the thickness of the belt decreases, and an operator who is charged with the maintenance of the belt conveyor sets this numerical value in advance for each line of a belt conveyor by considering the type of transport material being transported and the type of belt being used and also by taking their previous experience into account.

Figure 3A:
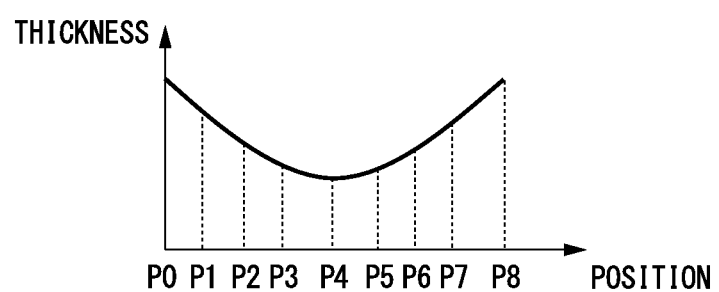
FIG. 3A is a view illustrating a calculation of the remaining lifespan of a belt by a belt lifespan prediction unit in the management server according to an embodiment of the present invention.
Figure 3B:
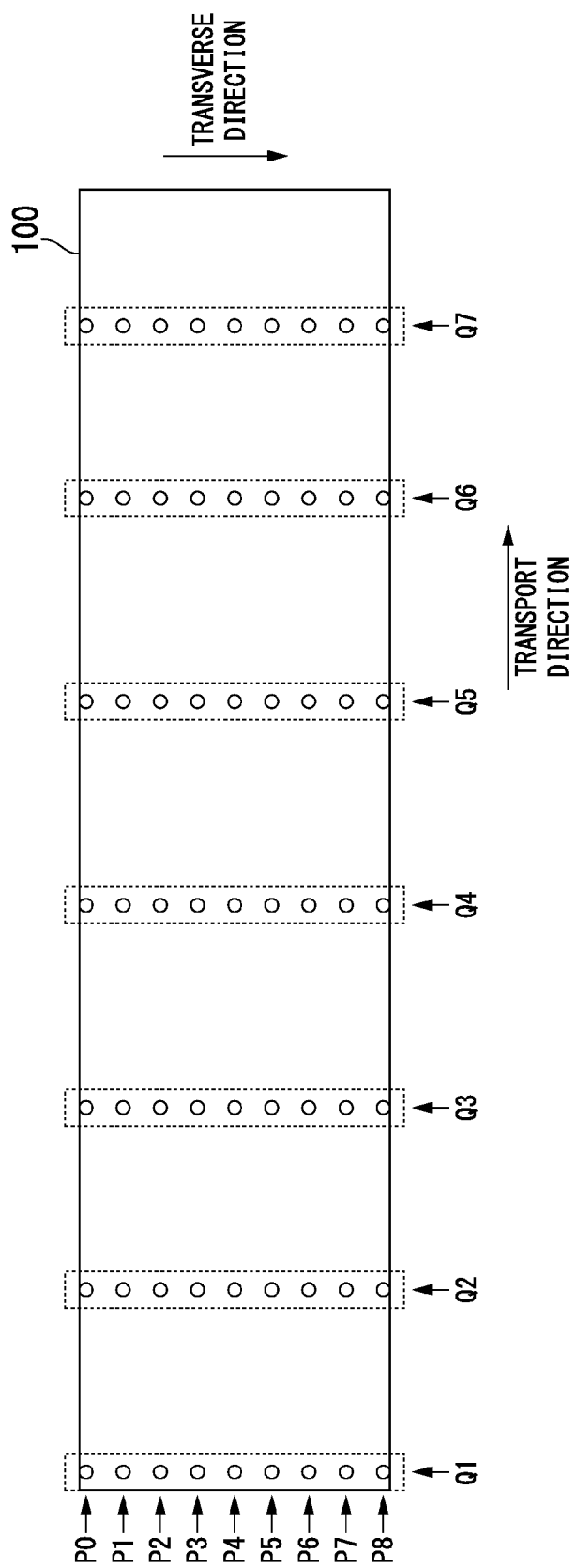
FIG. 3B is a view illustrating a calculation of the remaining lifespan of a belt by a belt lifespan prediction unit in the management server according to an embodiment of the present invention.
Figure 3C:
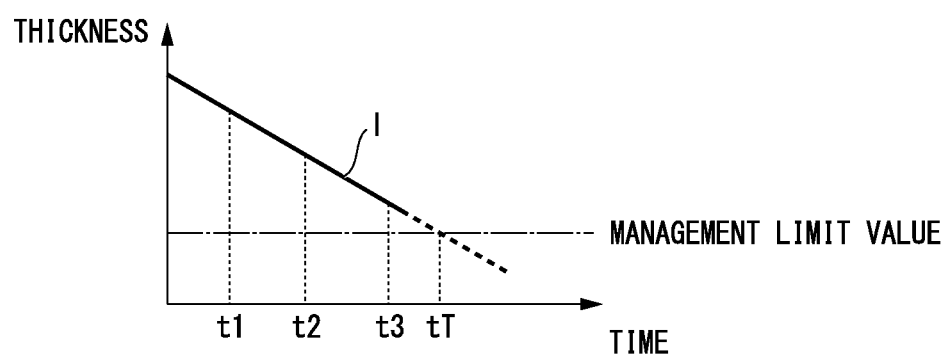
FIG. 3C is a view illustrating a calculation of the remaining lifespan of a belt by a belt lifespan prediction unit in the management server according to an embodiment of the present invention.

Next, FIGS. 3A, 3B, and 3C are views illustrating a calculation of a remaining lifespan performed by the belt lifespan prediction unit 11. FIG. 3A shows belt remaining thickness data for the transverse direction of the belt that is supplied periodically from the terminals 2. Here, the transverse direction of the belt refers to a direction on a surface of the belt of the belt conveyor on which transport material is placed that is perpendicular to the transporting direction of the belt. In FIG. 3A, the horizontal axis shows the position in the horizontal direction of the belt (for example, P0 is the right end, P4 is the center, and P8 is the left end of the belt), while the vertical axis shows the thickness of the belt (i.e., the remaining thickness).

FIG. 3B is a view illustrating the data structure of the belt remaining thickness data which is a group of the transverse direction thickness data shown in FIG. 3A. As is shown in FIG. 3B, the belt remaining thickness data is a group of thickness data for each one of a plurality of positions in the transverse direction of the belt, namely, for each one of nine positions P0 through P8.

This belt remaining thickness data is also supplied at each period by the terminals 2 for each one of a plurality of measurement positions in the transporting direction, for example, for each one of positions Q1 through Q7 that run in the transporting direction. These positions in the transporting direction divide the overall length of the belt into a plurality (seven in FIG. 3B) of sections, and are provided in each of these divided length units.

FIG. 3C is a view that is used to determine from the belt remaining thickness data at each of the times t1, t2, t3 a straight line 1 that shows the amount of change in the belt remaining thickness per unit time. In FIG. 3C, the horizontal axis shows time, while the vertical axis shows the thickness of the belt. The slope of the straight line 1 shows the wear rate. The broken line portions of the straight line 1 are extrapolated portions, and the time tT where the single-dot chain line reaches the management limit value is the time where it is predicted that the belt will need to be replaced. The belt remaining thickness data used in FIG. 3C is the belt remaining thickness data where the remaining thickness is at the minimum (i.e., is the belt minimum remaining thickness data) in 60 measurement locations, i.e., in the positions P0 through P8 of each one of the positions Q1 through Q7.

Next, FIGS. 4A and 4B are views showing the structures of a management table for each line of a belt conveyor that is installed in a particular factory, and of a usage history table that shows the usage history of the belt of each line with both these tables being stored in a management database 15. The management table is provided so as to correspond to an ID code and a password, and cannot be accessed from a terminal 2 that has a different ID code and password. FIG. 4A is a management table for each line of a belt conveyor that is installed in a particular factory, and management tables for each one of a plurality of lines, for example, for lines L1, L2, and L3 are written in advance into the management table storage area of the management database 15 and are stored therein. Here, the management data includes the belt length, the belt manufacturer, the belt part number, the material being transported, the belt thickness initial value, and the management limit value and the like.

Namely, the belt length is the total length (in meters: m) of the belt being used in the belt conveyor of a line. The belt manufacturer is the name of the manufacturer (i.e., the company name) that manufactures and sells the belt being used in the belt conveyor of a line. The belt part number is the product number that shows the type of belt. The material being transported is the type of material being transported on each line. The belt thickness initial value shows the thickness of the belt when the belt conveyor was installed (i.e., the initial mounting thickness). As has already been described, the management limit value shows the thickness of a belt that needs to be replaced from the standpoint of product quality which is set based on the type of transport material being transported and on the type of belt being used and with previous experience being taken into account.

Here, the data for each of the belt length, the belt manufacturer, the belt part number, the material being transported, the belt thickness initial value, and the management limit value are input in advance into the terminals 2, and are written in advance into the management table of the management database 15 by the transceiver unit 10 and stored therein.

FIG. 4B is a usage history table showing the usage history of the belts of each line shown in FIG. 4A, and usage history tables for each one of a plurality of lines, for example, for the lines L1 L2, and L3 are written in advance into the usage history table storage area of the management database 15 and are stored therein. Here, the usage history data includes the installation date, the date of the last measurement, the elapsed number of days, the total transport amount, the thickness data, the wear rate, the remaining lifespan, the planned replacement date, and the like.

From this graph, it can be clearly determined for how long a period transported material will be able to be transported henceforth from the current time, and estimating the approximate remaining period that the belt will be able to be used for from the current point in time can be done easily, so that planning order placements for each belt can be achieved with a high level of accuracy.

Namely, the installation date shows the year, month, and date that the belt of the belt conveyor of each line was replaced with a new belt. The date of the last measurement shows the year, month, and date when the most recent belt remaining thickness data was supplied. The elapsed number of days shows the number of days that have elapsed from the most recent installation date until the current year, month, and date. The total transport amount shows the total amount of material that has been transported by the belt from the installation date until the last elapsed number of days. The thickness data shows the most recent minimum thickness data for the belt (i.e., the belt minimum remaining thickness data). The wear rate is the speed at which the belt is becoming worn, and shows the amount of wear in units of days when the thickness data is subtracted from the belt thickness initial value, and the difference resulting from this subtraction is divided by the difference in days between the last measurement date and the installation date. The remaining lifespan is the number of days from the current date until the planned replacement date, and shows the number of days when the management limit value is subtracted from the thickness data, and the difference resulting from this subtraction is divided by the wear rate, and the difference in days between the elapsed number of days and the last measurement date is then subtracted from the result of the above division. The planned replacement date is the planned date for the belt to be replaced, and shows the year, month, and date when the management limit value is subtracted from the thickness data, and the difference resulting from this subtraction is divided by the wear rate, and the result of this division is then added to the last measurement date. Here, each of the line name, the installation date, the last measurement date (i.e., the date when the current belt remaining thickness data was supplied), the total transport amount, and the thickness data (i.e., the previous belt minimum remaining thickness data) are supplied from the terminals 2, and are written and stored in the usage history table in the management database 15 by the transceiver unit 10.

Returning to FIG. 2, the belt lifespan prediction unit 11 predicts the remaining lifespan and planned replacement date for each line in the factory or mine where each terminal 2 is installed.

The belt lifespan prediction unit 11 extracts the minimum thickness data from among the plurality of items of belt remaining thickness data, for example, from the belt remaining thickness data for the positions Q1 through Q7 that is transmitted at fixed periods from the terminals 2 via the transceiver unit 10, and uses this as the belt minimum remaining thickness data. Here, each time the belt remaining thickness data is transmitted at these fixed periods, the belt lifespan prediction unit 11 writes and stores the received date in the usage history table of the management database 15 as being the date of the last measurement.

The belt lifespan prediction unit 11 also extracts as the belt minimum remaining thickness data the minimum thickness data from among the belt remaining thickness data for the plurality of positions that was transmitted in one period. The belt lifespan prediction unit 11 then determines the straight line 1, as is shown in FIG. 3C, and calculates the wear rate as being the slope of this straight line. Moreover, the belt lifespan prediction unit 11 also writes and stores in the usage history table of the management database 15 the belt minimum remaining thickness data at the date of the last measurement as being the thickness data.

At this time, the belt lifespan prediction unit 11 reads the previous belt minimum remaining thickness data from the usage history table in the management database 15, and determines the wear rate as the slope between the current (i.e., the most recent) belt minimum remaining thickness data and the previous (i.e., the one immediately prior thereto) belt minimum remaining thickness data. Namely, the belt lifespan prediction unit 11 subtracts the current belt minimum remaining thickness data from the previous belt minimum remaining thickness data, and divides the difference resulting from this subtraction by the measurement period time so as to determine the wear rate.

The belt lifespan prediction unit 11 then writes and stores the determined wear rate in the usage history table in the management database 15.

Moreover, it is also possible for the belt lifespan prediction unit 11 to read the belt thickness initial value from the management table in the management database 15, and to subtract the current belt minimum remaining thickness data from the read belt thickness initial value, and to then divide the difference resulting from this subtraction by the elapsed number of days that it has read from the usage history table in the management database 15. At this time, the belt lifespan prediction unit 11 reads the installation date and the last measurement date from the usage history table in the management database 15, and subtracts the installation date from the last measurement date so as to derive the elapsed number of days. The belt lifespan prediction unit 11 then writes and stores the determined wear rate in the usage history table in the management database 15. The belt lifespan prediction unit 11 also writes the current belt minimum remaining thickness data in the thickness data in the usage history table in the management database 15.

Moreover, the belt lifespan prediction unit 11 reads the management limit value from the management table in the management database 15, and reads the wear rate from the usage history table, and subtracts the management limit value from the most recent belt minimum remaining thickness data, and divides the difference resulting from this subtraction by the wear rate so as to determine the remaining lifespan.

The belt lifespan prediction unit 11 then adds the remaining lifespan to the last measurement date, and determines the date when the remaining lifespan will drop below the management limit value, namely, determines the planned replacement date. Here, the belt lifespan prediction unit 11 writes and stores both the calculated remaining lifespan and planned replacement date in the usage history table in the management database 15.

Here, when the calculated remaining lifespan drops below a fundamental remaining lifespan that has been stored in advance in the management database 15, the belt lifespan prediction unit 11 sends notification recommending that the belt be replaced to the terminal 2 and the data server 3 via the transceiver unit 10 after having attached thereto information identifying the line (i.e., information showing which belt conveyor is being used in any of the locations, namely, the ID code and password, the line name, and the like).

Moreover, this fundamental remaining lifespan may be determined, for example, by the belt lifespan prediction unit 11 multiplying the amounts of wear during one measurement period, namely, by multiplying the wear rate by the time of one period, and is then written in advance in the management database 15 by the belt lifespan prediction unit 11. Note that the fundamental remaining lifespan may be calculated based on a fixed period, or may be determined by multiplying the wear rate by a predetermined time that has been established in advance.

Figure 5:
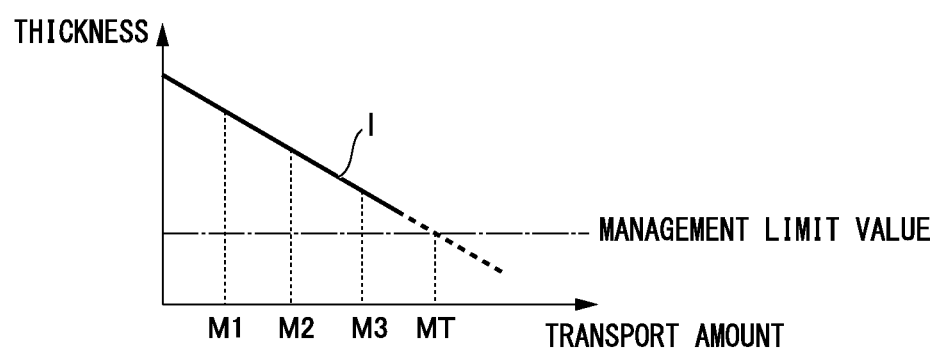
FIG. 5 is a view showing a relationship between a transport amount and belt minimum remaining thickness data in belt remaining thickness data according to an embodiment of the present invention.

Next, FIG. 5 is a view showing a relationship between the transport amount and the belt minimum remaining thickness data in belt remaining thickness data. The slope of the straight line 1 in this graph shows the amount of wear in transport amount units. In this way, the remaining lifespan may be the determined using the transport amount in units of predetermined periods (i.e., the transport amount in a fixed period is used as the usage amount units). The remaining lifespan at this time is determined as a transport amount (i.e., a unit change amount which uses the transport amount as units) which shows whether or not the belt minimum remaining thickness data has dropped below the management limit value from the amount of transport material that is to be subsequently transported. The transport amount MT shows the total weight of transport material when the belt minimum remaining thickness data drops below the management limit value. From this graph, it can be clearly determined how much transport material will be able to be transported henceforth from the current time, and estimating the approximate remaining period that the belt will be able to be used for can be achieved easily from the amount of material that is planned to be transported, so that planning order placements for each belt can be achieved with a high level of accuracy.

Returning to FIG. 2, the belt lifespan prediction unit 11 subtracts the management limit value from the most recent belt minimum remaining thickness data, and by dividing the difference resulting from this subtraction by an amount of wear that corresponds to the unit transport amount, the transport amount until the belt minimum remaining thickness data reaches the management limit value is determined and used as the remaining lifespan.

The belt lifespan prediction unit 11 then divides the total transport amount when the most recent belt remaining thickness data was obtained by the elapsed number of days, and uses the result of this division as the average transport amount, which is the amount of material transported per day.

The belt lifespan prediction unit 11 then divides the remaining lifespan serving as a transport amount by the average transport amount, and adds the result of this division to the last measurement date. The result of this addition is then determined to be the planned replacement date.

[Total Cost of Ownership Calculating Unit 12]

The total cost of ownership calculating unit 12 writes and stores cost data that is supplied from the terminals 2 in the expenditure tables in the expenditure database 16.

Next, FIGS. 6A and 6B are views showing examples of the structure of expenditure tables (i.e., an operation table and a usage history table (described below)) in the expenditure database 16. In the same way as the management tables, the expenditure tables are provided so as to correspond to an ID code and a password, and cannot be accessed from a terminal 2 having a different ID code and password.

FIG. 6A shows the structure of an operation table of the expenditure database 16 which shows the belt of the belt conveyor that is used on each line in a factory or mine, and also shows the costs of operations of the belt conveyor. In FIG. 6A, the line name shows each line, the company name shows the manufacturer of the belt that is used on the belt conveyor of that line, the installation date shows the date when the belt was installed on that belt conveyor, and the material cost shows the cost of that belt. Furthermore, the endless operating costs show the costs involved in the task of mounting the belt in an endless circle so as to form the belt conveyor on each line. The maintenance costs show the costs incurred by maintenance such as repairs to the belt of the belt conveyor. The electricity cost shows the cost of the electricity used to operate the belt conveyor.

Returning to FIG. 2, the total cost of ownership calculating unit 12 divides (the belt purchase cost+the endless costs+the electricity) by the period of use in, for example, years, and divides the result of this division by the belt length, and uses the result of this division as a TOC (total cost (/years)) corresponding to the period of use. In addition, the total cost of ownership calculating unit 12 divides (the belt purchase cost+the endless costs+the electricity) by the transport amount (in, for example, the number of tons), and uses the result of this division as a TOC (total cost (/tons)) corresponding to the transport amount. The total cost of ownership calculating unit 12 then writes and stores the obtained TOC in the expenditure tables in the expenditure database 16. Here, the belt purchase cost is the material cost shown in FIGS. 6A and 6B.

Namely, the total cost (/years) shows the cost per year that is obtained by dividing the total expenditure from the point when the belt was installed up until the current time by the number of years that the belt has been used using the following formula. The total cost (/tons) shows the cost by weight that is obtained by dividing the total expenditure from the point when the belt was installed up until the current time by the total amount of material that has been transported (for example, in units of tons) using the following formula. Moreover, in order to simplify comparisons of belts between a plurality of belt conveyors, the total cost (/years) and the total cost (/tons) may also be divided by the length of the belt in each belt conveyor.

FIG. 6B is an example of the structure of a usage history table of the expenditure database 16 which shows the belt of the belt conveyor that is used on each line in a factory or mine, and also shows the replacement history of the belt conveyor. In FIG. 6B, the line name shows each line, the installation period shows the period from when the belt was installed until that belt was replaced, the company name shows the manufacturer of the belt that is used on the belt conveyor of that line, and the material cost shows the cost of that belt. The endless operating costs show the costs involved in the task of mounting the belt in an endless circle so as to form the belt conveyor on each line.

The maintenance costs show the costs incurred by maintenance such as repairs to the belt of the belt conveyor. The electricity cost shows the cost of the electricity used to operate the belt conveyor. The total cost (/years) shows the cost per year that is obtained by dividing the total expenditure from the point when the belt was installed up until the current time by the number of years that the belt has been used using the following formula. The total cost (/tons) shows the cost by weight that is obtained by dividing the total expenditure from the point when the belt was installed up until the current time by the total amount of material that has been transported (for example, in units of tons) using the following formula.

Returning to FIG. 2, the total cost of ownership calculating unit 12 calculates the total cost (/years) and the total cost (/tons) using the following formula based on the line name, the company name, the installation date, the material cost, the endless operation costs, the maintenance costs, the total amount of material transported, and the electricity cost (i.e., based on cost data). The total cost of ownership calculating unit 12 then writes and stores the total cost (/years) and the total cost (/tons) in the operation table and usage history table in the expenditure database 16.

Moreover, in the history of the line 1 shown in FIG. 6B, the installation period X~ is information for the belt of the belt conveyor currently being used. The installation period S~X shows information relating to the belt of the belt conveyor that was used during the period immediately prior to the current period. As a result of this, the TCO (Total Cost of Ownership) which shows the total operating costs including the operations of the belt conveyor is made visible to the operator of the terminal 2.

As a result of this, in the present embodiment, an operator is able to ascertain for each type of belt being used on the belt conveyor not only the price of the belt, but also the TCO of the belt conveyor of each line, and can thereby easily compare the cost performance of the belts being used.

[Belt Inventory Management Unit 13]

The belt inventory management unit 13 writes and stores inventory data that is supplied from the terminals 2 via the transceiver unit 10 in a inventory table in the inventory database 17. This inventory data includes the manufacturer, the part number, belt identification information, remaining quantity (i.e., inventory quantity), the part number total remaining quantity, and the management remaining quantity. In the same way as the management tables, the inventory table is provided so as to correspond to an ID code and a password, and cannot be accessed from a terminal 2 having a different ID code and password.

Next, FIG. 7 is a view showing an example of the structure of the inventory table in the inventory database 17. In FIG. 7, the manufacturer is the name of the company that manufactures and sells the belt, the part number is a number showing the product type of that belt, and the belt identification information is information identifying each individual belt in lot units of those belts, for example, in units of the rolls on which the belts are wound. The remaining quantity shows the inventory quantity (for example, in units of meters) as a remaining quantity of the belt of the lot indicated by that belt identification information, and a remaining quantity of "FUL" shows that the product is unused and that, for example, the entire 1000 meters still remains. For lots that have already been used, the remaining quantity (i.e., the inventory quantity) is shown as it is in meter units. The part number total remaining quantity shows the entire remaining quantity of the same product.

For example, there are two "FUL" and one 200 m for the product number B1 of Company A, so that the part number total remaining quantity is 2200 meters. The management remaining quantity shows the minimum required inventory quantity of a belt that past experience suggests will be needed in order to deal with a fault occurring in the belt of a belt conveyor.

Returning to FIG. 2, the belt inventory management unit 13 writes the inventory data supplied via the transceiver unit 10 from the terminals 2 in the inventory table of the inventory database 17, and calculates the part number total remaining quantity. Here, the belt inventory management unit 13 adds together all of the remaining quantities of belts having the same part number, and writes and stores the result of this addition as the part number total remaining quantity such that it corresponds to the part number in the inventory table in the inventory database 17.

Moreover, each time updated information concerning belt inventory data is supplied from a terminal 2, the belt inventory management unit 13 extracts the part number from this inventory data. As is described above, the belt inventory management unit 13 then determines the part number total remaining quantity that corresponds to the extracted part number.

Next, the belt inventory management unit 13 reads the management remaining quantity that corresponds to the part number, and compares it with the newly determined part number total remaining quantity.

If as a result of this comparison, the part number total remaining quantity is found to have dropped below the management remaining quantity, the belt inventory management unit 13 attaches information identifying the line to a notification that includes the part number and also includes contents recommending that a new order be placed, and transmits this notification to the terminal 2 and to the data server 3 of the manufacturer that manufactures and sells this belt.

Moreover, the above-described inventory table is categorized according to manufacturer, however, it is also possible to create tables for the manufacturer, part number, belt identification information, remaining quantity, part number total remaining quantity, and management remaining quantity for each belt conveyor line.

As a result of this, an operator in a factory or mine or the like is able to constantly verify the latest inventory situation, and is able to easily create a timetable to show when a suitable quantity (i.e., length) of belt should be ordered. As a consequence, proper inventory management can be performed enabling a sufficient quantity to deal with any damages to a particular belt to be kept in stock without any superfluous inventory being held.

Moreover, the manufacturer who manufactures and sells the belt is able to predict approximately when and in approximately what quantity a belt may be ordered from each factory and mine, and is consequently able to establish a manufacturing timetable. Accordingly, the manufacturer is able to prevent problems such as having to hold superfluous inventory, or not being able to respond instantly to an order.

The above-described belt identification information is written into an RFID (Radio Frequency IDentification) or into a barcode that are attached or adhered to the roll of each belt or to the packing material thereof. An operator at the factory or mine reads belt identification information for inventory articles at regular intervals using an RFID or barcode reader. If a roll is unused, the description [FUL], or if the roll has been used, the actual remaining quantity is used as the inventory data with the manufacturer and part number being added thereto. The operator then connects the reader to the terminal 2, and transmits the inventory data from the terminal 2 to the management server 1.

[Fault Management Unit 14]

The fault management unit 14 determines whether or not a fault exists by comparing detection data supplied via the transceiver unit 10 from the terminals 2 with a preset threshold value (i.e., a detection threshold value (described below)). If it determines that a fault does exist, it writes and stores the fault data in a fault table in the fault database 18. This fault data includes the detection date, the line number, and the detection position and the like. In the same way as the management tables, the fault table is provided so as to correspond to an ID code and a password, and cannot be accessed from a terminal 2 having a different ID code and password.

Next, FIGS. 8A and 8B are views showing examples of the structure of tables that are written in advance and stored in the fault database 18. FIG. 8A is a threshold value table showing detection threshold values that are used to determine whether or not a fault such as a breakage has occurred, and that are set for each line. In FIG. 8A, the line number is the number of a line (i.e., is information identifying the line) that is installed in the factory or mine or the like, while the detection threshold value is set for each line, and is compared with a detection value that shows the state of the belt being used on the line and that is transmitted at fixed periods.

FIG. 8B is a fault history table showing in a time series information about the line on which a fault is determined to have occurred. In FIG. 8B, the detection date shows the year, month, and date on which the line fault was detected, the line number is the number of the line where the belt fault was detected, the detection position shows the position where the belt fault was detected, and the index is an address showing an area where an image that shows the position where the belt fault occurred is stored.

Figure 9:
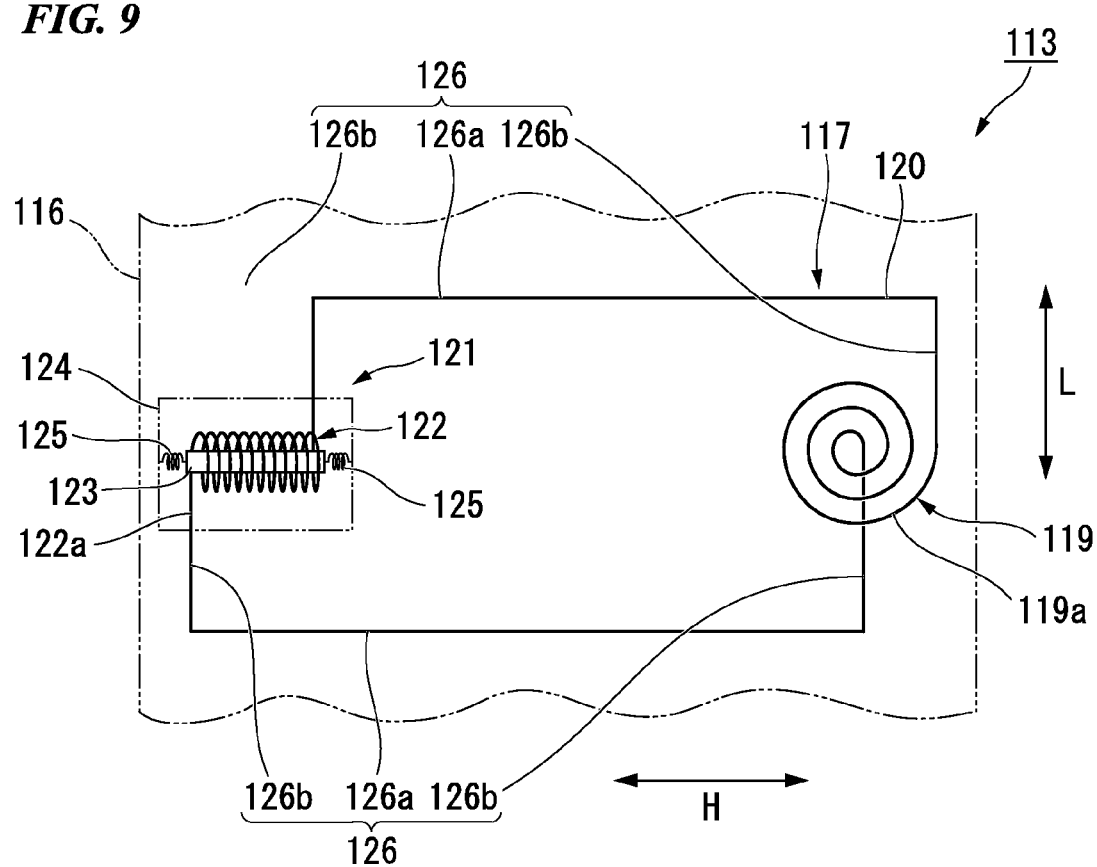
FIG. 9 is a view showing a detection object that is embedded in the belt of a belt conveyor according to an embodiment of the present invention, and is used to detect vertical tears which are one form of damage to a belt.

Next, FIG. 9 is a view showing a detection object 117 that is embedded in a belt 113 of a belt conveyor, and is used to detect vertical tears which are one form of damage to a belt.

The belt 113 is provided with a main rubber body 116 that extends in a belt longitudinal direction (i.e., the direction in which transported material is transported) L, and with a plurality of detection objects 117 that are placed at intervals from each other in the belt longitudinal direction L. The main rubber body 116 is formed, for example, from a rubber material that is able to undergo sulfur vulcanization. For this rubber material it is possible to use, for example, natural rubber (NR), isoprene rubber (IR), butadiene rubber (BR), styrene-butadiene copolymer rubber (SPR), and the like either individually or in various combinations.

Moreover, a plurality of tension members (not shown) that are formed from steel cord or from organic fiber cord are arranged in a belt transverse direction H so as to extend lengthwise in the belt longitudinal direction L. Examples of an organic fiber cord include nylon, polyester, and aramid. The plurality of tension members are arranged inside the main rubber body 116 so as to extend over substantially the entire area in the belt transverse direction H in a central portion in a thickness direction of the main rubber body 116.

The detection objects 117 are embedded inside the main rubber body 116 in a portion thereof that is located further to the rear surface side of the main rubber body 116 than the central portion in the thickness direction where the tension members are embedded. A toroidal circuit 120 that has a coil portion 119 and has a toroidal shape in plan view when the belt 113 is viewed in the thickness direction is provided in each detection object 117. The toroidal circuit 120 extends in the belt transverse direction H between the two side edge portions of the main rubber body 116, and in the example shown in the drawing, when seen in the aforementioned plan view, the toroidal circuit 120 has a rectangular ring shape that is elongated in the belt transverse direction H.

In the coil portion 119, a conductive wire 119a is wound around a coil axis, and in the example shown in the drawing, the conductive wire 119a is wound around a plurality of times. The coil axis of the coil portion 119 extends in the aforementioned thickness direction, and the coil portion 119 excites a magnetic field in this thickness direction upon being supplied with current. In the aforementioned plan view, the coil portion 119 is formed in a spiral shaped that is wound around so as to become gradually narrower in diameter as it moves from one end of the conductive wire 119a to the other end thereof, and the spacing between conductive wires 119a that are mutually adjacent in the radial direction of the coil portion 119 remains the same.

Moreover, each coil portion 119 of the plurality of detection objects 117 are arranged such that their positions in the belt transverse direction H are the same as each other. In the present embodiment, because each coil portion 119 is arranged in the same way on one side edge portion out of the two side edge portions of the main rubber body 116, the positions in the belt transverse direction H of each coil portion 119 are mutually the same as each other.

Moreover, in the present embodiment, an oscillating power generator 121 that, when vibration is applied to it, generates power and supplies this power to the coil portion 119 is provided in the toroidal circuit 120.

The oscillating power generator 121 is provided with an excitation coil 122 that is electrically connected to the coil portion 119, a magnetic body 123 that is positioned coaxially with the excitation coil 122, and a housing case 124 in which the excitation coil 122 and the magnetic body 123 are housed.

The housing case 124 is formed in a rectangular parallelepiped shape whose sides, when seen in plan view, extend in both the belt longitudinal direction L and the belt transverse direction H.

The excitation coil 122 is formed as a result of a conductive wire 122a being wound around the coil axis and, in the example shown in the drawing, the coil axis of the coil portion 119 extends in the belt transverse direction H. The excitation coil 122 is formed by winding the conductive wire 122a a plurality of times such the diameter of each wind is the same, but with the position of each wind being shifted in the belt transverse direction H so that the overall shape of the excitation coil 122 is formed in a circular cylinder that extends in the belt transverse direction H.

Moreover, the two end portions of the conductive wire 122a that forms the excitation coil 122 are fixed respectively to portions of the housing case 124 that are mutually opposite each other in the belt longitudinal direction L.

The magnetic body 123 is disposed such that it is able to move in the belt transverse direction H. When the magnetic body 123 moves in the belt transverse direction H along the coil axis of the excitation coil 122, excitation force is generated by electromagnetic induction in the excitation coil 122. In the example shown in the drawing, the magnetic body 123 is formed in a rod shape, and is inserted inside the excitation coil 122. The size in the belt transverse direction H of the magnetic body 123 is equivalent to the size in the belt transverse direction H of the excitation coil 122. Both end portions in the belt transverse direction H of the magnetic body 123 are connected separately to an internal surface of the housing case 124 via elastic components 125 that are able to deform elastically in the belt transverse direction H. In the example shown in the drawings, the elastic components 125 are formed by coil springs.

Moreover, each of the oscillating power generators 121 in the plurality of detection objects 117 is arranged such that their positions in the belt transverse direction H are mutually the same as each other. In the present embodiment, because all of the respective oscillating power generators 121 are located in common with each other on the other side edge portion where the coil portion 119 is not provided out of the two side edge portions of the main rubber body 116, the positions in the belt transverse direction H of each oscillating power generator 121 are mutually the same as each other. In addition, the positions in the belt longitudinal direction L of the oscillating power generators 121 are the same as the positions in the belt longitudinal direction L of the coil portion 119.

A connecting conductive wire 126 that extends in a circumferential direction around the toroidal circuit 120 and connects together the coil portion 119 and the oscillating power generator 121 is provided in the toroidal circuit 120. The connecting conductive wire 126 is arranged as a pair of connecting conductive wires so as to sandwich the coil portion 119 and the oscillating power generator 121 from both sides in the belt longitudinal direction L.

The connecting conductive wire 126 is provided with main conductive wires 126a that extend in the belt transverse direction H and whose two end portions are located on the respective side edge portions of the main rubber body 116, and with a pair of auxiliary conductive wires 126b that extend in the belt longitudinal direction L from the two end portions of the main conductive wires 126a.

The end portions of the two end portions of the auxiliary conductive wires 126b that are not connected to the main conductive wires 126a are separately connected to an end portion of the conductive wire 119a that forms the coil portion 119, or an end portion of the conductive wire 122a that forms the excitation coil 122 of the oscillating power generator 121. In the example shown in the drawings, these end portions are joined together as a single body, and the coil portion 119, the excitation coil 122, and the connecting conductive wires 126 are formed as a single body. Moreover, of the auxiliary conductive wires 126b of the conductive wires 126, the auxiliary conductive wire 126b that is joined to the other end of the conductive wire 119a that forms the coil portion 119 is placed further to the rear surface side of the main rubber body 116 in the aforementioned thickness direction than the coil portion 119 such that the auxiliary conductive wire 126b does not come into contact with portions of the coil portion 119 other than the aforementioned other end thereof.

Figure 10:
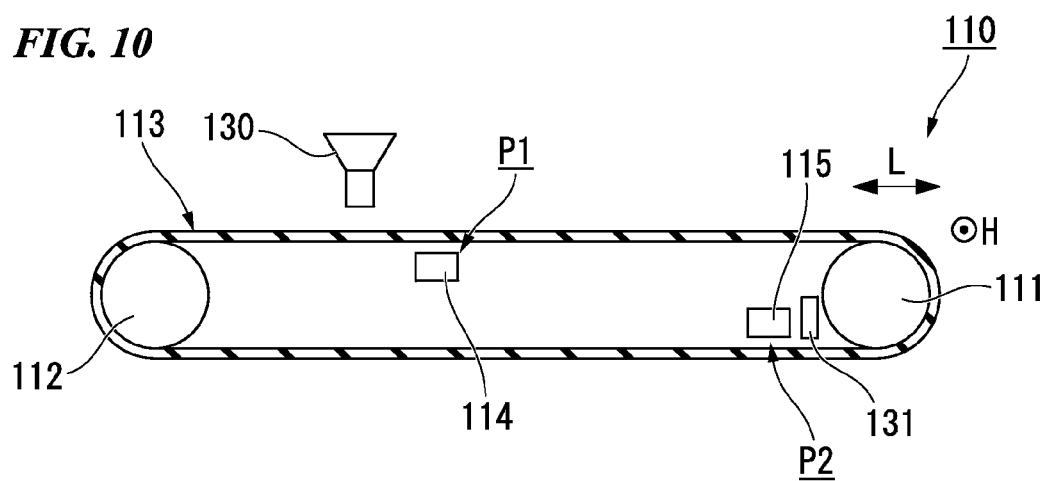
FIG. 10 is a side view of a belt conveyor that uses a belt that is provided with the detection object shown in FIG. 9.

FIG. 10 is a side view of a belt conveyor 110 that uses the belt 113 in which the detection objects 117 shown in FIG. 9 are provided.

As is shown in FIG. 10, as detection portions 114 and 115, a first detection portion 114 that is located at a transporting start position P1 that is adjacent to a hopper 130 on a drive pulley 111 side thereof is provided on the carrier side of the belt path along which the belt 113 passes, while a second detection portion 115 that is located at a return start position P2 is provided on the return side of the belt path along which the belt 113 passes. The first detection portion 114 is positioned so as to be adjacent to the hopper 130 in the belt longitudinal direction L, while the second detection portion 115 is positioned so as to be adjacent to a shake-off means 131 in the belt transverse direction H.

The respective detection portions 114 and 115 are located on outer sides of the center in the belt transverse direction H of the belt 113 such that they face the aforementioned edge portions on the one side of the main rubber body 116 on the rear surface side of the belt 113, and they detect vertical cracks in the belt 113 by detecting a magnetic field that is excited by the coil portion 119. The detection portions 114 and 115 may include, for example, a detection coil (not shown) in which an induction current is generated by the magnetic field excited by the coil portion 119, and a device that detects the current value of the induction current generated in this detection coil and outputs it as detection data together with the line name to the terminal 2.

Here, as is shown in FIG. 10, when the belt 113 is in operation, if transport material is dropped from the hopper 130 resulting in external force being applied to the carrier side of the belt 113, vibration is imparted to the carrier side of the belt 113 as it passes the transporting start position P1. Vibration is also imparted to the return side of the belt 113 as it passes the return start position P2 due to the shake-off means 131.

When the portions of the belt 113 where the toroidal circuits 120 are located travel past the two start positions P1 and P2 to which vibration is being imparted, provided that the toroidal circuits 120 are not broken, current flows through the coil portions 119 as a result of the oscillating power generators 121 generating power, resulting in a magnetic field being excited. If, on the other hand, a vertical crack has formed in the belt 113 so that the toroidal circuit 120 is broken, the current does not flow to the coil portion 119, and no magnetic field is excited. Accordingly, it is possible to detect vertical cracks in the belt 113 using the detection of the magnetic fields excited by the coil portions 119 by the respective detection portions 114 and 115 that are located at the two positions P1 and P2.

Here, by gradually changing the distance between the individual detection objects 117 and other adjacent detection objects 117, the point where a vertical crack has occurred can be detected using the cycle of the current detected by the detection portions 114 and 115. Moreover, a mark is set on the belt 113 as the placement start position of the above-described belt detection objects 117, and for example, magnets or the like are embedded in side portions of the belt 113 that do not become worn, and these marks are then detected by a magnetic sensor enabling the terminal 2 to accumulate detection data in units of revolutions for the belt 113.

Next, using the output from the magnetic sensor, each time the belt completes one revolution the terminal 2 transmits to the management server 1 the detection data output by the detection portions 114 and 115 that was sampled in a time series.

The fault management unit 14 compares the detection data supplied from the terminal 2, namely, the current values measured by the detection portions 114 and 115 in sequence with detection threshold values (i.e., current values) read from the threshold value table.

Here, the fault management unit 14 detects a current value that exceeds the detection threshold current value as a peak value, and measures the cycle in which this peak value was detected, and determines the situation to be normal when the cycle is becoming sequentially longer. In contrast, if the cycle in which the peak value is detected first becomes longer, then becomes shorter again than the cycle immediately prior, the fault management unit 14 determines that a current value exceeding the detection threshold value has not been detected, namely, determines that the detection object 117 in that position is not damaged. Damage to this detection object 117 shows a vertical crack in the belt 113. Because of this, the fault management unit 14 detects that damage from a vertical crack in the belt 113 has occurred.

Next, because a fault has occurred in the belt 113, the fault management unit 14 creates the same number of images of the position of the detection objects 117 in sequence from the start mark as the number of peaks including the peak of the current that was shorter than the cycle immediately prior, and writes and stores these in the fault database 18.

The fault management database 14 also writes and stores in the fault history table in the fault database 18 the supplied year, month, and date, the line number (i.e., the line name), the detection position (i.e., the number in sequence of the detection object 117 from the start mark), and the address of the area where the image showing the position of the detection object 117 on the belt 113 is stored.

The fault management unit 14 attaches information identifying the line to a notification showing damage to the belt of that line, namely, a notification showing that a fault has occurred, and transmits this notification to the terminal 2 and to the data server 3 by email or the like.

By doing this, an operator who is charged with maintaining the belt conveyor is able to confirm the occurrence of any faults, and is able to respond to these within a short period of time. Furthermore, because the company that manufactures and sells the belt is able to acquire information showing the type of belt in which the fault occurred irrespective of where the belt conveyor was installed, that company is able to make preparations to respond immediately when an order arrives.

Moreover, in order to detect a breakage in the steel cord of the belt 113, it is also possible to photograph an x-ray image of the belt 113 using an x-ray apparatus, and to detect the position of the breakage in the steel cord by performing image processing on this x-ray image. The breakage position in this case can be specified from the position where the end portions of the belt are connected together in the belt conveyor, and from the transporting speed of the belt conveyor.

[Belt Remaining Thickness Data and Measurement of the Transport Material Transport Quantity]

Figure 11:
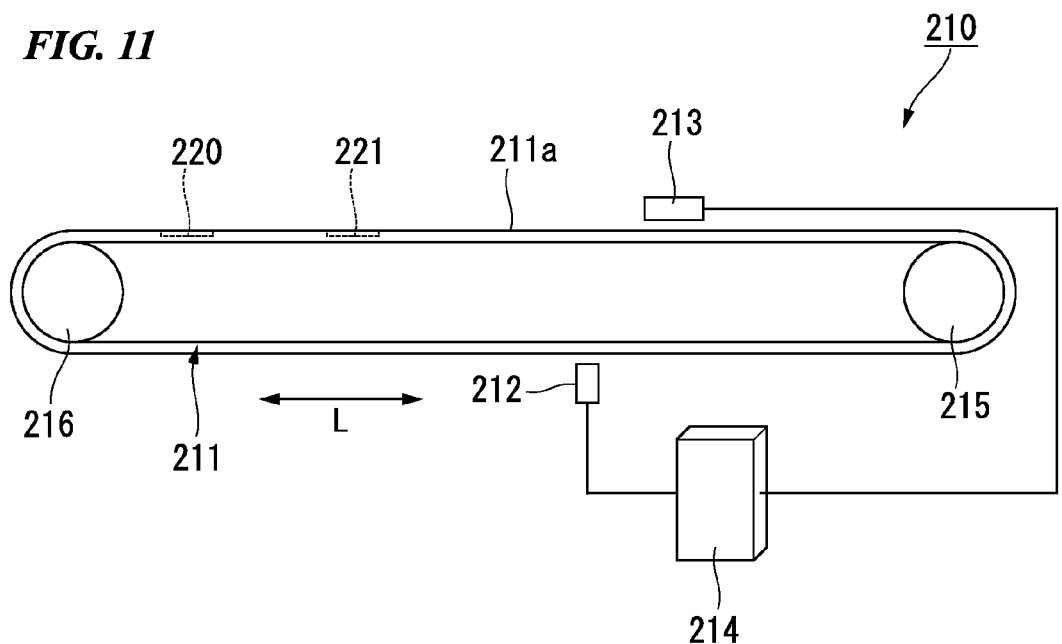
FIG. 11 is a side view of a belt conveyor apparatus on a line according to an embodiment of the present invention.
Figure 12:
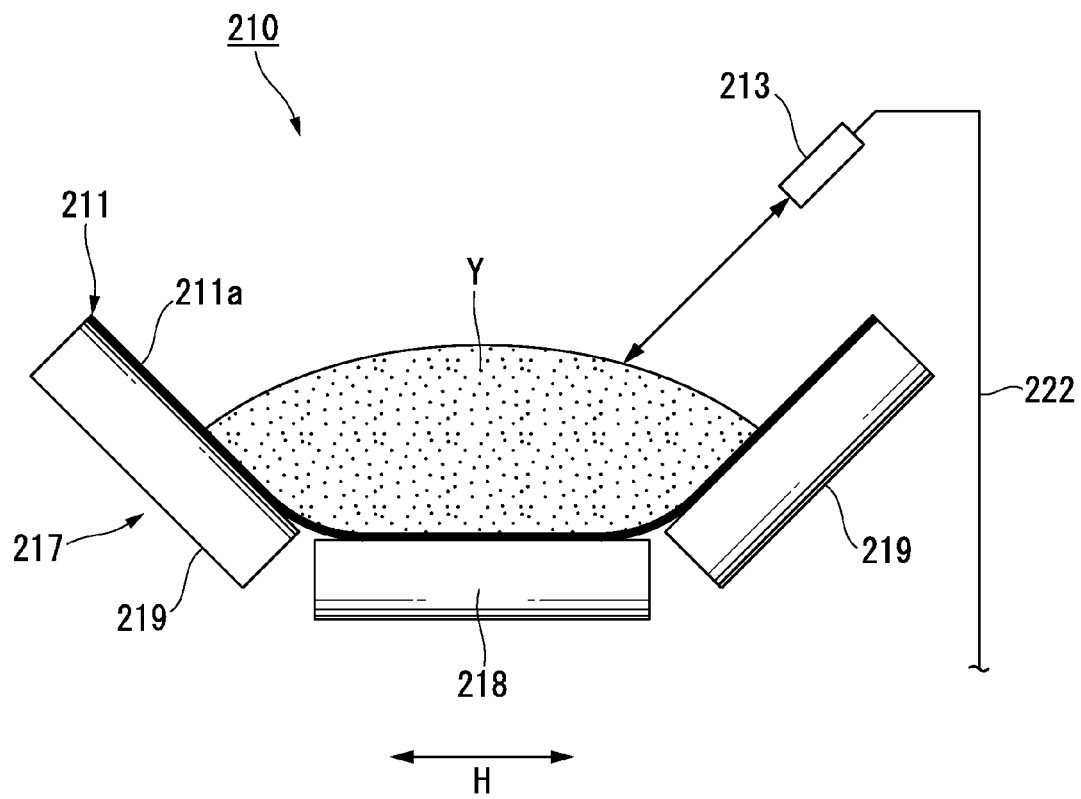
FIG. 12 is a partial vertical cross-sectional view of principal portions that make up the belt conveyor apparatus shown in FIG. 11.

FIG. 11 is a side view of a belt conveyor apparatus 210 on a line according to the present embodiment. FIG. 12 is a partial vertical cross-sectional view of principal portions that make up the belt conveyor 210 shown in FIG. 11. As is shown in FIG. 11 and FIG. 12, the belt conveyor apparatus 210 is provided with an endless belt-shaped belt 211 that transports transport material Y, a wear amount measuring means (i.e., a revolution detecting means) 212 that measures an amount of wear of a surface 211a of the belt 211 on which the transport material Y is loaded, a load height measuring means 213 that measures the load height of the transport material Y that has been loaded onto the belt 211, and a calculation unit (i.e., a revolution number measuring means) 214 that acquires separate measurement data from both the wear amount measuring means 212 and the load height measuring means 213. This calculation unit 214 is provided in the terminal 2.

The belt 211 is entrained between a pair of pulleys 215 and 216 that are able to rotate around rotation shafts that extend in a horizontal direction. In the example shown in the drawing, a drive pulley 215 and the slave pulley 216 are provided as the pair of pulleys 215 and 216, and the rotation shaft of these two pulleys 215 and 216 are parallel with each other and also extend in the belt transverse direction H.

Moreover, the carrier side of the belt 211 where the surface 211a faces vertically upwards travels between the drive pulley 215 and the slave pulley 216 while being supported in a trough shape by a plurality of belt supporting means 217 that are lined up in the belt circumferential direction L. Each belt supporting means 217 is provided with a center roller 218 that is able to rotate freely around a rotation shaft that extends in the belt transverse direction H, and supports a center portion in the belt transverse direction H of the belt 211, and with a pair of side rollers 219 that are placed on both outer sides in the belt transverse direction H of the center roller 218 and that are able to rotate freely around rotation shafts that slope diagonally relative to the rotation shaft of the center roller 218, and that support mutually opposite side edge portions in the belt transverse direction H of the belt 211.

The carrier side of the belt 211 transports the transport material Y that has been loaded onto the belt 211 from the slave pulley 216 (i.e., the one pulley) side towards the drive pulley 215 (i.e., the other pulley) side. A hopper (not shown) that drops the transport material Y onto the belt 211 is provided above the carrier side of the belt 211, and the carrier side of the belt 211 transports the transport material Y that has been dropped from the hopper to an unloading portion (not shown) that is provided on the drive pulley 215 side.

In the example shown in the drawings, the return side of the belt 211 where the surface 211a faces vertically downwards travels while being in a completely flat state in the belt transverse direction H.

A first magnetic field generating means 220 and a second magnetic field generating means 221 that generate magnetic fields towards the surface 211a side of the belt 211 are separately provided in the belt 211. In the present embodiment, the first magnetic field generating means 220 and the second magnetic field generating means 221 are placed such that the positions thereof in the belt circumferential direction L are different from each other, while the positions thereof in the belt transverse direction H are the same as each other.

The polarities of the respective magnetic fields of the first magnetic field generating means 220 and the second magnetic field generating means 221 are different from each other on the surface 211a side of the belt 211. In the present embodiment, the magnetic field generating means 220 and 221 are each formed by a single rubber magnet that has sufficient flexibility to enable it to be deformed as it follows the belt 211, and the respective magnetic fields of the rubber magnet used to form the first magnetic field generating means 220 and the rubber magnet used to form the second magnetic field generating means 221 have different polarities on the surface 211a side of the belt 211. The rubber magnets are formed by bond magnetic objects that are formed, for example, by dispersing the magnetic powder of a permanent magnet material in a rubber compound such that the rubber magnets are magnetized in the thickness direction of the belt 211. Rare earth magnets such as neodymium-iron-boron or samarium-iron-nitrogen magnets, arco magnets, and ferrite and the like can be employed for the magnetic powder.

The first magnetic field generating means 220 is embedded, for example, in the belt 211 such that it is exposed from the surface 211a thereof, and the first magnetic field generating means 220 becomes worn at the same rate as the surface 211a of the belt 211 is worn. As the surface 211a of the belt 211 becomes worn, for example, the size of the magnetic field generated by the first magnetic field generating means 220, the range in the belt transverse direction H of the magnetic field generated by the first magnetic field generating means 220, and the range in the belt circumferential direction L generated by the first magnetic field generating means 220 all change. Namely, this first magnetic field generating means 220 is located on the belt 211 so as to correspond to each of the measurement points shown in FIG. 3B and such that the measurement points are clearly distinct.

The wear amount measuring means 212 measures the wear amount using the belt 211 at the time it was first put to use as a reference, and, in the present embodiment, is formed by magnetic sensors that measure as the amount of wear of the surface 211a of the belt 211 the magnetic field of the first magnetic field generating means 220 that, as is described above, changes in accordance with the amount of wear of the surface 211a of the belt 211. For example, Gauss meters or loop coils or the like can be employed as the magnetic sensors.

The wear amount measuring means 212 is positioned so as to face the surface 211a on the return side of the belt 211. It is also possible to provide a transverse direction guide (not shown) that regulates movement in the belt transverse direction H of the belt 211 in a facing portion of the belt path along which the return side of the belt 211 passes where it faces the wear amount measuring means 212, and to provide a thickness direction guide that supports the belt 211 from the rear surface side thereof and that restricts the belt 211 from moving away in the thickness direction of the belt 211 from the wear amount measuring means 212.

Moreover, in the present embodiment, the wear amount measuring means 212 detects a start and a finish of one revolution of the belt 211. In the example shown in the drawings, the wear amount measuring means 212 detects the magnetic field of the second magnetic field generating means 221 as the start and finish of one revolution of the belt 211, and when it detects the end of one revolution of the belt 211, the start of the next revolution of the belt 211 is detected.

The load height measuring means 213 measures the load height of the transport material Y that has been loaded onto one portion of the belt 211. In the present embodiment, the load height measuring means 213 is located in a measurement portion of the belt path on the carrier side of the belt 211 and is positioned on the drive pulley 215 side of the hopper. The load height measuring means 213 measures the load height of the transport material Y which has been loaded onto the portion of the belt 211 that passes this measurement portion.

Moreover, the load height measuring means 213 is located on the surface 211a side of the belt 211, and is formed by distance sensors that measure the distance from the load height measuring means 213 to the transport material Y by emitting, for example, light such as laser light or the like, or ultrasonic waves, and then receiving a reflection of this light or ultrasonic waves, and use this distance as the load height of the transport material Y.

In the present embodiment, the load height measuring means 213 is located above the belt 211 and the belt supporting means 217, and emits light or ultrasonic waves towards the transport material Y that has been loaded onto the belt 211.

In the example shown in the drawings, the load height measuring means 213 is held by a bracket 222 such that, when the transport material Y has not been loaded onto the surface 211a of the belt 211, it emits light or ultrasonic waves onto the center in the belt transverse direction H of the surface 211a of the belt 211. The load height measuring means 213 is positioned on the outer side in the belt transverse direction H of the center portion in the belt transverse direction H of the belt 211, and emits light or ultrasonic waves diagonally downwards towards the inner side in the belt transverse direction H.

The distance from the load height measuring means 213 to the transport material Y changes in accordance with the load height, namely, this distance becomes shorter as the load height of the transport material Y that has been loaded onto the belt 211 becomes larger, and this distance becomes longer as the load height becomes smaller.

Load amounts of the transport material Y per unit load height that have been determined in advance are stored in the calculation unit 214, and based on the load amount of transport material Y per unit load height, and on measurement data acquired from the load height measuring means 213, the calculation unit 214 is able to calculate the load amount of transport material Y that has been loaded onto the portion of the belt 211 that passes the measurement portion at those timings when the measurement data is acquired.

Moreover, the calculation unit 214 also determines when the belt 211 is in operation and is not in operation. In the present embodiment, based on detection data for the start and end of one revolution of the belt 211 that the calculation unit 214 acquires from the wear amount measuring means 212, the calculation unit 214 determines that the belt 211 is in operation if, after it detects the start of a revolution of the belt 211, it detects the end of that revolution within a predetermined revolution time that has been set in advance. If, on the other hand, the calculation unit 214 detects the start of a revolution but does not detect the end of that revolution before the aforementioned predetermined revolution time has elapsed, then the calculation unit 214 determines that the belt 211 is not in operation. For this predetermined revolution time, it is possible to use, for example, a time obtained by adding an extra time margin to the standard time that it takes the belt 211 to complete one revolution.

Furthermore, the calculation unit 214 also measures the number of revolutions of the belt 211 from the time when the belt 211 was first put to use. In the present embodiment, based on the detection data from the wear amount measuring means 212, the calculation unit 214 measures the number of revolutions by adding one revolution to the number of revolutions made by the belt 211 each time the belt 211 completes one revolution.

Moreover, in the present embodiment, based on measurement data for the amount of wear of the belt 211 that it acquires from the wear amount measuring means 212, the calculation unit 214 calculates the remaining thickness of the belt 211. The remaining thickness of the belt 211 (i.e., the belt thickness data in the belt remaining thickness data) is calculated by subtracting the amount of wear of the belt 211 from the thickness of the belt 211 when it was first put to use (i.e., the belt thickness initial value) which has been stored in advance in the calculation unit 214.

Next, an operation of the belt conveyor apparatus 210 will be described.

In the belt conveyor apparatus 210, when the belt 211 is made to travel by the drive pulley 215, the calculation unit 214 determines whether the belt 211 is in operation or is not in operation, and also continuously acquires measurement data from the load height measuring means 213. Of the measurement data acquired from the load height measuring means 213, the data that is acquired while the belt 211 is determined to be in operation is used to calculate the total amount of transport material Y (described below). When the belt 211 is determined to be not in operation, the calculation unit 214 does not need to acquire measurement data from the load height measuring means 213.

The calculation unit 214 also measures the number of revolutions of the belt 211, and each time the belt 211 has revolved for a fixed number of revolutions such as, for example, 1000 revolutions, the calculation unit 214 acquires measurement data from the wear amount measuring means 212 and measures the amount of wear using the wear amount measuring means 212.

In the present embodiment, when the amount of wear is measured by the wear amount measuring means 212, the calculation unit 214 calculates the total amount of transport material Y that has been transported by the belt 211 up until the time when the wear amount was measured based on measurement data acquired from the load height measuring means 213 from the time when the belt 211 was first put to use until the time when the wear amount was measured.

At this time, based on a plurality of measurement data items acquired from the load height measuring means 213 at different timings while the belt 211 was in operation, and on the load amount of transport material Y per unit load height, the calculation unit 214 individually calculates the load amounts of transport material Y that was loaded onto the belt 211 at the respective timings when each one of the plurality of measurement data items was acquired up until the time when the wear amount was measured.

Thereafter, the calculation unit 214 adds these respective load amounts together so as to derive the total amount of transport material Y.

As has been described above, according to the belt conveyor apparatus 210 of the present embodiment, at the time when the wear amount was measured by the wear amount measuring means 212, the calculation unit 214 calculates the total amount of transport material Y that has been transported by the belt 211 up until that time when the wear amount was measured.

In addition, at each measurement cycle, the terminals 2 transmit to the management server 1 the belt remaining thickness data determined by the calculation unit 214 as well as the amount of transport material Y that has been transported from the previous cycle until the current cycle.

Note that it is also possible to record a program that achieves the functions of the management server 1 shown in FIG. 1 on a computer-readable recording medium, and for the belt management of the belt conveyor to be performed by causing a computer system to read and execute the program recorded on this recording medium. Note that the term 'computer system' used here includes both OS and hardware such as peripheral devices and the like.

Moreover, if a WWW system is being employed, then the term 'computer system' may also include a homepage providing environment (or display environment).

Moreover, the term computer readable recording medium' also refers to portable media such as flexible disks, magneto-optical disks, ROM, and CD-ROM and the like, and storage devices such as hard disks and the like that are built into a computer system. Furthermore, 'computer readable recording medium' includes devices that dynamically hold programs for a short time such as communication lines when the program is being transmitted via a network such as the Internet or via a communication circuit such as a telephone line, and also includes devices that hold a program for a fixed time such as the internal volatile memory in a computer system which forms the server or client in this case. Moreover, the program may be one that performs a portion of the above functions, or may be one that performs the above functions in combination with a program that is already recorded on a computer system.

An embodiment of this invention has been described in detail above with reference made to the drawings, however, the specific structure of this invention is not limited to this embodiment and various design modifications and the like may be made thereto insofar as they do not depart from the spirit or scope of this invention.

INDUSTRIAL APPLICABILITY

There is provided a belt management system and a method for the same that make clear when a belt needs to be replaced, and reduce the running costs of a belt conveyor by managing the belts being held in inventory.

DESCRIPTION OF REFERENCE SIGNS

1 . . . Management server
2 . . . Terminals
3 . . . Data servers
10 . . . Transceiver unit
11 . . . Belt lifespan prediction unit
12 . . . Total cost of ownership calculating unit
13 . . . Belt inventory management unit
14 . . . Fault management unit
15 . . . Management database
16 . . . Expenditure database
17 . . . Inventory database
18 . . . Fault database
I . . . Information communication network

The invention claimed is:

1. A belt management system that is formed by a management server that manages belts that are used in a belt conveyor, a terminal that is provided in a location where the belt conveyor is installed, and a data server that is provided in a company that manufactures and sells belts, wherein
the management server is provided with:
a transceiver unit that receives in time series belt remaining thickness data that shows the thickness of the belt and that is supplied from the terminal at each one of predetermined periods;
a belt lifespan prediction unit that, by writing the belt remaining thickness data in the management database in time series, and reading from the management database the belt remaining thickness data that has been stored in time series, and dividing the difference between the predetermined periods by the usage amount of the belt at each of the predetermined periods, and determining a unit amount of change in the usage amount units, and subtracting from the most recent belt remaining thickness data a management threshold value which shows the thickness of the belt, and dividing the result of this subtraction by the unit amount of change, determines a remaining lifespan that shows the future amount of use until the belt needs to be replaced;
an expenditure database in which a total cost of ownership is written and stored, in belt conveyor units, for each different type of belt, the total cost of ownership including at least belt price, maintenance costs, and electricity cost; and
a total cost of ownership calculating unit that determines a total cost in usage amount units by dividing a sum total of the belt price, the maintenance costs, and the electricity cost that has been stored in the expenditure database by the usage amount, and associating the total cost in usage amount units with the corresponding belt of the belt conveyor and writing and storing the results in the expenditure database,
wherein a measuring device that measures the belt remaining thickness data is provided in the belt conveyer,
wherein the belt remaining thickness data is either data that has been measured and input into the terminal, or data that is measured by the measuring device and is collected from the measurement device by the terminal.

2. The belt management system according to claim 1, wherein, when the remaining lifespan drops below a usage amount in the predetermined period that has been set in advance, the belt lifespan prediction unit transmits an alarm recommending that the belt be replaced to the terminal and the data server.

3. The belt management system according to claim 1, wherein
the terminal transmits to the management server the belt remaining thickness data that has been measured after each of the predetermined periods by the measuring unit.

4. The belt management system according to claim 1, wherein the usage amount is the weight of transport material that has been transported by the belt conveyor, and the remaining lifespan shows the weight that can be subsequently transported from the point in time when the most recent belt remaining thickness data was measured.

5. The belt management system according to claim 1, wherein the usage amount is the period for which the belt conveyor transported the transport material, and the remaining lifespan shows the period for which transport material can be subsequently transported from the point in time when the most recent belt remaining thickness data was measured.

6. The belt management system according to claim 1, wherein the management server is further provided with:
an inventory database in which an inventory quantity for each different type of belt at the location where the belt conveyor is installed, and a management remaining quantity which shows the minimum inventory quantity of each different type of belt that is required in order to manage the belt conveyor are written and stored in advance; and
a belt inventory management unit that, when the inventory quantity drops below the management remaining quantity, recommends to the terminal and the data server that it is necessary to buy new inventory.

7. The belt management system according to claim 1, wherein the management server is further provided with:
a fault database that shows detection threshold values that are set for each line and are used to determined whether or not a fault has occurred; and
a fault management unit that compares detection values showing the state of a belt that are supplied from the terminal with the detection threshold values, and when the result of this comparison indicates a fault in the belt, transmits a notification to the terminal and to the data server that shows that a fault has occurred in the belt.

8. A belt management method that causes a belt management system that is formed by a management server that manages belts that are used in a belt conveyor, a terminal that is provided in a location where the belt conveyor is installed, and a data server that is provided in a company that manufactures and sells belts to operate, wherein
the belt management method includes:
a computer system implementing the steps of:

a receiving step in which belt remaining thickness data that shows the thickness of the belt and that is supplied from the terminal is received in time series at each one of predetermined periods;

a belt lifespan prediction step in which, by writing the belt remaining thickness data in the management database in time series, and reading from the management database the belt remaining thickness data that has been stored in time series, and dividing the difference between the predetermined periods by the usage amount of the belt at each of the predetermined periods, and determining a unit amount of change in the usage amount units, and subtracting from the most recent belt remaining thickness data a management threshold value which shows the thickness of the belt, and dividing the result of this subtraction by the unit amount of change, a remaining lifespan that shows the future amount of use until the belt needs to be replaced is determined;

a recording step wherein a total cost of ownership is written and stored in an expenditure database, in belt conveyor units, for each different type of belt, the total cost of ownership including at least belt price, maintenance costs, and electricity cost; and a calculating step wherein a total cost of ownership calculating unit determines a total cost in usage amount units by dividing a sum total of the belt price, the maintenance costs, and the electricity cost that has been stored in the expenditure database by the usage amount, and associating the total cost in usage amount units with the corresponding belt of the belt conveyor and writing and storing the results in the expenditure database, wherein a measuring device that measures the belt remaining thickness data is provided in the belt conveyor, wherein the belt remaining thickness data is either data that has been measured and input into the terminal, or data that is measured by the measuring device and is collected from the measurement device by the terminal.

9. A belt management method in which data is exchanged between a terminal that is provided at a location where a belt conveyor is installed and a management server that manages the belts used on the belt conveyor, wherein the belt management method includes:

a computer system implementing the steps of:

a transmitting step in which belt remaining thickness data that shows the thickness of the belt is transmitted by the terminal in time series to the management server after predetermined periods;

a receiving step in which, when the remaining lifespan determined by the management server that shows the future amount of use of the belt until it needs to be replaced drops below a usage amount in the predetermined period that has been set in advance, an alarm recommending that the belt be replaced is received by the terminal from the management server;

a recording step wherein a total cost of ownership is written and stored in an expenditure database, in belt conveyor units, for each different type of belt, the total cost of ownership including at least belt price, maintenance costs, and electricity cost; and a calculating step wherein a total cost of ownership calculating unit determines a total cost in usage amount units by dividing a sum total of the belt price, the maintenance costs, and the electricity cost that has been stored in the expenditure database by the usage amount, and associating the total cost in usage amount units with the corresponding belt of the belt conveyor and writing and storing the results in the expenditure database, wherein a measuring device that measures the belt remaining thickness data is provided in the belt conveyor, wherein the belt remaining thickness data is either data that has been measured and input into the terminal, or data that is measured by the measuring device and is collected from the measurement device by the terminal.

10. The belt management method according to claim 9, wherein the belt remaining thickness data that has been measured after each of the predetermined periods by the measuring unit is transmitted from the terminal to the management server.

11. The belt management method according to claim 9, wherein an inventory quantity for each different type of belt at the location where the belt conveyor is installed is transmitted by the terminal, and when the inventory quantity drops below a predetermined management remaining quantity, notification from the management server is received by the terminal recommending to it that it is necessary to buy new inventory.

12. The belt management method according to claim 9, wherein detection values that show the state of the belt are transmitted by the terminal to the management server, and when the detection values are compared with a preset detection threshold value and, as a result, indicate that there is a fault in the belt, notification showing that a fault has occurred in the belt is received by the terminal from the management server.

* * * * *